United States Patent
Kim et al.

(10) Patent No.: US 12,530,455 B2
(45) Date of Patent: Jan. 20, 2026

(54) METHOD AND APPARATUS FOR DETECTING ANOMALY STATUS BASED ON SYSTEM SCREEN

(71) Applicant: ELECTRONICS AND TELECOMMUNICATIONS RESEARCH INSTITUTE, Daejeon (KR)

(72) Inventors: Hyung-Kwan Kim, Daejeon (KR); Jong-Won Choi, Daejeon (KR); Seung-Oh Choi, Daejeon (KR); Jeong-Han Yun, Daejeon (KR); Won-Seok Hwang, Daejeon (KR); Woo-Myo Lee, Daejeon (KR); Byung-Gil Min, Daejeon (KR); Hyeok-Ki Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 225 days.

(21) Appl. No.: 18/209,623

(22) Filed: Jun. 14, 2023

(65) Prior Publication Data
US 2024/0289455 A1     Aug. 29, 2024

(30) Foreign Application Priority Data
Feb. 27, 2023 (KR) .................. 10-2023-0025882

(51) Int. Cl.
*G06F 21/56*      (2013.01)
*G06V 10/40*    (2022.01)
*G06V 10/75*    (2022.01)

(52) U.S. Cl.
CPC ............ *G06F 21/566* (2013.01); *G06V 10/40* (2022.01); *G06V 10/759* (2022.01)

(58) Field of Classification Search
CPC ........ G06F 21/50; G06F 21/51; G06F 21/566; G06F 11/3438; G06F 11/3452; G06V 10/40; G06V 10/74; G06V 10/759
See application file for complete search history.

(56) References Cited

U.S. PATENT DOCUMENTS

2020/0285555 A1*   9/2020   Suh .................. G06F 11/3452
2023/0029794 A1*   2/2023   Huang ................ G06N 3/084
(Continued)

FOREIGN PATENT DOCUMENTS

CN    111400547 A  *  7/2020   ......... G06F 16/7328
KR    10-1950335 B1    2/2019
(Continued)

OTHER PUBLICATIONS

Yeo-Jeong Yoon et al. "Detection of System Abnormal State by Cyber Attack", Journal of The Korea Institute of Information Security & Cryptology, vol. 29, No. 5, Oct. 2019.

*Primary Examiner* — Boris D Grijalva Lobos
(74) *Attorney, Agent, or Firm* — LRK PATENT LAW FIRM

(57) ABSTRACT

Disclosed herein is a method for detecting an anomaly state based on screen output. The method includes receiving the output screen of a target device to be monitored, setting a target region to be examined in the output screen of the target device to be monitored, calculating a feature value vector corresponding to the state of the target region to be examined, calculating an anomaly score using a pretrained auto-encoder by receiving the feature value vector as input, and determining whether the target device to be monitored is anomalous using the anomaly score.

16 Claims, 15 Drawing Sheets

(56) References Cited

U.S. PATENT DOCUMENTS

| | | | |
|---|---|---|---|
| 2023/0038164 A1* | 2/2023 | Naeini | G06N 5/022 |
| 2023/0185884 A1* | 6/2023 | Ryan | G06V 10/40 |
| | | | 726/26 |
| 2023/0360388 A1* | 11/2023 | Singh | G06V 30/10 |
| 2024/0153090 A1* | 5/2024 | Saikou | G16H 30/40 |
| 2024/0378128 A1* | 11/2024 | Lev | G06F 11/3438 |

FOREIGN PATENT DOCUMENTS

| | | |
|---|---|---|
| KR | 10-2020-0040469 A | 4/2020 |
| KR | 10-2021-0100415 A | 8/2021 |

\* cited by examiner

| D | E | F | G | H | I | J | K | L | M | N | O | P | Q | R | S | T |
|---|---|---|---|---|---|---|---|---|---|---|---|---|---|---|---|---|
| label | frame | roi1 | roi2 | roi31 | roi32 | roi4 | roi5 | roi11 | roi12 | roi13 | roi14 | roi15 | roi16 | roi17 | roi18 | roi19 |
| ./mov/20210503.2-progress.mov | 5 | 13 | 9 | 23 | 17 | 35 | 6 | 11 | 6 | 19 | 84 | 61 | 97 | 46 | 12 | 8 |
| ./mov/20210503.2-progress.mov | 8 | 13 | 9 | 23 | 17 | 35 | 6 | 11 | 6 | 19 | 84 | 61 | 97 | 46 | 12 | 8 |
| ./mov/20210503.2-progress.mov | 12 | 12 | 9 | 23 | 17 | 35 | 6 | 11 | 6 | 19 | 84 | 61 | 97 | 46 | 12 | 8 |
| ./mov/20210503.2-progress.mov | 15 | 12 | 7 | 23 | 15 | 35 | 6 | 11 | 6 | 17 | 84 | 61 | 97 | 46 | 1 | 8 |
| ./mov/20210503.2-progress.mov | 17 | 12 | 7 | 23 | 15 | 36 | 6 | 11 | 6 | 20 | 85 | 62 | 98 | 47 | 1 | 8 |
| ./mov/20210503.2-progress.mov | 25 | 12 | 7 | 23 | 15 | 36 | 6 | 11 | 6 | 20 | 85 | 62 | 98 | 47 | 1 | 6 |
| ./mov/20210503.2-progress.mov | 30 | 12 | 7 | 6 | 15 | 36 | 6 | 11 | 1 | 20 | 85 | 62 | 98 | 41 | 11 | 6 |
| ./mov/20210503.2-progress.mov | 32 | 12 | 7 | 23 | 15 | 36 | 6 | 11 | 1 | 21 | 86 | 17 | 99 | 48 | 1 | 6 |
| ./mov/20210503.2-progress.mov | 45 | 12 | 7 | 23 | 15 | 36 | 6 | 11 | 1 | 21 | 86 | 17 | 99 | 6 | 1 | 6 |
| ./mov/20210503.2-progress.mov | 46 | 12 | 7 | 23 | 15 | 36 | 6 | 11 | 1 | 22 | 87 | 63 | 100 | 49 | 1 | 6 |
| ./mov/20210503.2-progress.mov | 53 | 12 | 7 | 23 | 15 | 36 | 1 | 11 | 1 | 22 | 87 | 63 | 100 | 49 | 1 | 6 |
| ./mov/20210503.2-progress.mov | 60 | 12 | 7 | 23 | 15 | 37 | 1 | 11 | 1 | 6 | 88 | 64 | 101 | 50 | 1 | 6 |
| ./mov/20210503.2-progress.mov | 68 | 12 | 7 | 23 | 15 | 37 | 6 | 11 | 1 | 6 | 88 | 64 | 18 | 50 | 1 | 6 |
| ./mov/20210503.2-progress.mov | 74 | 12 | 7 | 23 | 15 | 37 | 6 | 11 | 1 | 6 | 89 | 64 | 18 | 50 | 11 | 6 |
| ./mov/20210503.2-progress.mov | 75 | 12 | 7 | 23 | 15 | 37 | 6 | 11 | 1 | 23 | 90 | 65 | 102 | 51 | 11 | 6 |
| ./mov/20210503.2-progress.mov | 89 | 12 | 7 | 23 | 15 | 37 | 1 | 11 | 1 | 6 | 88 | 65 | 100 | 12 | 1 | 6 |
| ./mov/20210503.2-progress.mov | 90 | 12 | 7 | 23 | 15 | 38 | 6 | 11 | 1 | 6 | 88 | 65 | 100 | 12 | 1 | 6 |
| ./mov/20210503.2-progress.mov | 103 | 12 | 7 | 23 | 15 | 38 | 6 | 11 | 1 | 6 | 91 | 65 | 103 | 12 | 1 | 6 |
| ./mov/20210503.2-progress.mov | 105 | 12 | 7 | 23 | 15 | 38 | 6 | 11 | 1 | 6 | 91 | 65 | 103 | 12 | 1 | 6 |
| ./mov/20210503.2-progress.mov | 115 | 12 | 7 | 23 | 15 | 38 | 1 | 11 | 1 | 22 | 86 | 66 | 104 | 52 | 1 | 6 |
| ./mov/20210503.2-progress.mov | 125 | 12 | 7 | 23 | 15 | 38 | 0 | 11 | 0 | 10 | 86 | 9 | 76 | 52 | 1 | 6 |
| ./mov/20210503.2-progress.mov | 135 | 12 | 7 | 23 | 15 | 38 | 6 | 11 | 0 | 10 | 86 | 66 | 33 | 52 | 11 | 6 |
| ./mov/20210503.2-progress.mov | 137 | 12 | 7 | 23 | 15 | 39 | 6 | 11 | 1 | 6 | 92 | 62 | 105 | 53 | 1 | 6 |
| ./mov/20210503.2-progress.mov | 144 | 12 | 7 | 23 | 15 | 39 | 6 | 11 | 1 | 6 | 92 | 62 | 105 | 53 | 11 | 6 |
| ./mov/20210503.2-progress.mov | 150 | 12 | 7 | 23 | 15 | 39 | 0 | 11 | 1 | 6 | 92 | 62 | 80 | 53 | 11 | 6 |

FIG. 8

METHOD AND APPARATUS FOR DETECTING ANOMALY STATUS BASED ON SYSTEM SCREEN

CROSS REFERENCE TO RELATED APPLICATION

This application claims the benefit of Korean Patent Application No. 10-2023-0025882, filed Feb. 27, 2023, which is hereby incorporated by reference in its entirety into this application.

BACKGROUND OF THE INVENTION

1. Technical Field

The present disclosure relates generally to technology for designing/developing an apparatus for monitoring anomaly status, such as a device error, a security threat, a mistake of a user, or the like, by monitoring the state of a device screen, such as an HMI or the like, which changes depending on operation by a user, an algorithm, or the like.

2. Description of Related Art

These days, AI technology is actively used for fault diagnosis or detection of a security threat in a control system. However, it is not easy to apply detection technology to an actual control system due to the following reasons.

First, access to a control network or installation of agent software may make it difficult to ensure availability of an existing control system, and may result in exposure to a new security threat.

Also, a pipeline specialized for each site has to be separately produced according to a protocol of an operating information server of a control system in order to acquire data.

Therefore, there is demand for an anomaly detection system that can be installed as an add-on in an existing system in order to ensure availability and security of the control system and to provide convenience of installation.

There is technology for a monitoring system based on recognition of multiple pieces of information, which is configured to extract screen information using a screen capture device while minimizing an effect on an already constructed control system, to combine recognized information, and to thereby smoothly analyze a fault. However, in order to substitute the screen with event information, 1) a user has to identify all screen patterns in advance and register the same in a system and 2) has to perform a process of mapping the registered patterns to events.

Because a large-scale control system such as a power plant is operated by complicated control logic, acquiring all image patterns on each screen in advance is a very burdensome task. Also, because innumerable anomaly situations are present, it is practically impossible to combine respective image patterns and to map the same to an anomaly event, and there is a critical disadvantage in which an anomaly situation cannot be detected unless it is predefined.

Therefore, in order to smoothly apply this in the field, the process of extracting operation information from screen information must be automated by setting a minimum number of parameters.

Also, the corresponding technology generates an event such as failure prediction by combining pieces of recognized information, but this is merely a heuristic form of association analysis method that simply combines some conditional statements. Because an abnormal event in a control system includes innumerable abnormal situations due to the scale of the control system, it is very difficult to predefine such situations one by one and implement a prediction system based on conditional statements. Further, there is a critical disadvantage in which an abnormal situation that is not predefined cannot be detected.

Accordingly, in order to monitor an abnormal situation, it is necessary to collect a sufficient amount of normal data and to make a monitoring system autonomously learn normal states based on the collected data such that anomaly status is monitored.

Also, there is technology for a system configured to collect screens by directly connecting a capture device with a target device, to read characters in the screen, and to transmit the same to an integrated monitoring center, but in the screen of a control system, information, such as a tank level, the degree of opening a valve, the water temperature, whether a motor is operating, and the like, is generally represented using images such that an operator can easily identify the operation status. Therefore, it is impossible to collect all information on the screen using a method of acquiring only information of text data, such as letters or numbers. Therefore, the method of monitoring the screen of a control system is required to extract not only text but also a changing image as a single piece of information.

Consequently, a method for monitoring screen output of a control system is required to determine whether the current situation is normal or abnormal and explain the cause of a problem such that an operator is able to recognize the current problem situation and take quick action.

DOCUMENTS OF RELATED ART (Patent Document 1) Korean Patent Application Publication No. 2021-0100415, titled "Surveillance system and method by recognizing multiple pieces of information".

SUMMARY OF THE INVENTION

An object of the present disclosure is to provide a method for detecting anomaly status by monitoring screen information output through the target device to be monitored when it is difficult to install agent software in the target device to be monitored.

Another object of the present disclosure is to detect anomaly status based on numeric values, image information, and the like on a dashboard that shows the state of the target device to be monitored.

In order to accomplish the above objects, a method for detecting an anomaly state based on screen output according to an embodiment of the present disclosure includes receiving an output screen of a target device to be monitored, setting a target region to be examined in the output screen of the target device to be monitored, calculating a feature value vector corresponding to the state of the target region to be examined, calculating an anomaly score using a pretrained auto-encoder by receiving the feature value vector as input, and determining whether the target device to be monitored is anomalous using the anomaly score.

Here, the feature value vector may be calculated based on a pattern dictionary predefined to correspond to each of patterns in the target region to be examined.

Here, the pattern dictionary may be a predefined vector corresponding to a numeric value or an image in the target region to be examined.

Here, the auto-encoder may be pretrained by using a screen output in a normal state of the target device as training data.

Here, determining whether the target device to be monitored is anomalous may comprise determining that the target device to be monitored is in an anomaly state when the anomaly score is greater than a threshold.

Here, determining whether the target device to be monitored is anomalous may comprise determining that the target device to be monitored is in an anomaly state when an integral value of the anomaly score in a preset section, which is calculated using the distribution of the anomaly score changing over time, is greater than a threshold.

Here, the method may further include providing an anomaly state alarm when it is determined that the target device to be monitored is in an anomaly state, and the anomaly state alarm may include a screen in which an anomaly part is displayed to be distinguished from other parts in the target region to be examined in the output screen of the target device to be monitored.

Here, the anomaly state alarm may include information acquired by visualizing time-series data of the anomaly score.

Also, in order to accomplish the above objects, an apparatus for detecting an anomaly state based on screen output according to an embodiment of the present disclosure includes a reception unit for receiving an output screen of a target device to be monitored, a region setting unit for setting a target region to be examined in the output screen of the target device to be monitored, a vector calculation unit for calculating a feature value vector corresponding to the state of the target region to be examined, an anomaly score calculation unit for calculating an anomaly score using a pretrained auto-encoder by receiving the feature value vector as input, and an anomaly detection unit for determining whether the target device to be monitored is anomalous using the anomaly score.

Here, the feature value vector may be calculated based on a pattern dictionary predefined to correspond to each of patterns in the target region to be examined.

Here, the pattern dictionary may correspond to a predefined vector corresponding to a numeric value or an image in the target region to be examined.

Here, the auto-encoder may be pretrained by using a screen output in a normal state of the target device as training data.

Here, determining whether the target device to be monitored is anomalous may comprise determining that the target device to be monitored is in an anomaly state when the anomaly score is greater than a threshold.

Here, determining whether the target device to be monitored is anomalous may comprise determining that the target device to be monitored is in an anomaly state when an integral value of the anomaly score in a preset section, which is calculated using the distribution of the anomaly score changing over time, is greater than a threshold.

Here, the apparatus may further include an alarm provision unit for providing an anomaly state alarm when it is determined that the target device to be monitored is in an anomaly state, and the anomaly state alarm may include a screen in which an anomaly part is displayed to be distinguished from other parts in the target region to be examined in the output screen of the target device to be monitored.

Here, the anomaly state alarm may include information acquired by visualizing time-series data of the anomaly score.

BRIEF DESCRIPTION OF THE DRAWINGS

The above and other objects, features, and advantages of the present disclosure will be more clearly understood from the following detailed description taken in conjunction with the accompanying drawings, in which:

FIG. 8 is an example of concatenation of feature value vectors extracted from a target region to be examined;

DESCRIPTION OF THE PREFERRED EMBODIMENTS

Figure 1:
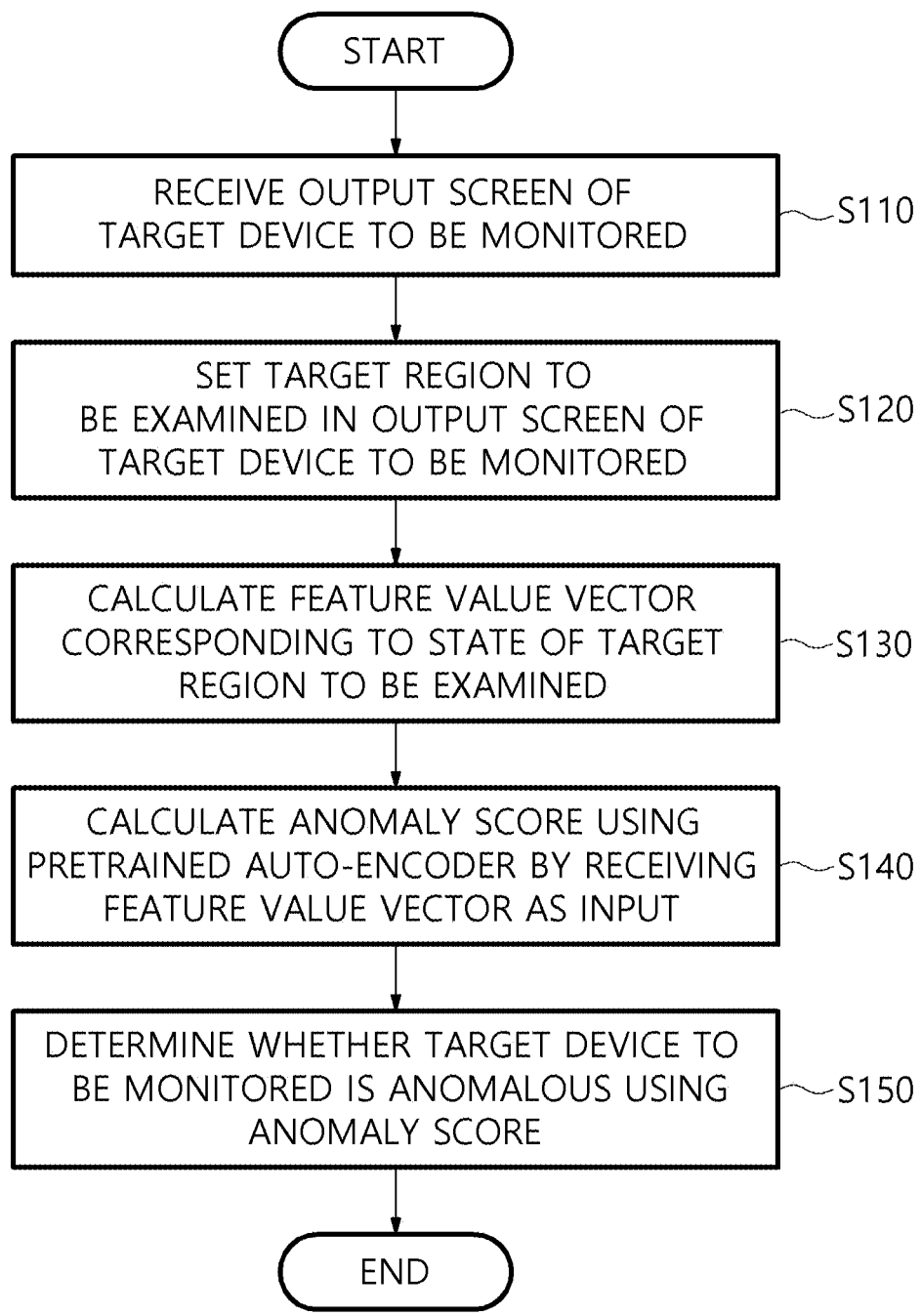
FIG. 1 is a flowchart illustrating a method for detecting an anomaly state based on screen output according to an embodiment of the present disclosure.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

In the present specification, each of expressions such as "A or B", "at least one of A and B", "at least one of A or B", "A, B, or C", "at least one of A, B, and C", and "at least one of A, B, or C" may include any one of the items listed in the expression or all possible combinations thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a flowchart illustrating a method for detecting an anomaly state based on screen output according to an embodiment of the present disclosure.

The method for detecting an anomaly state based on screen output according to an embodiment of the present disclosure may be performed by an apparatus for detecting an anomaly state based on screen output, such as a computing device.

Referring to FIG. 1, the method for detecting an anomaly state based on screen output according to an embodiment of the present disclosure includes receiving the output screen of the target device to be monitored at step S110, setting the target region to be examined in the output screen of the target device to be monitored at step S120, calculating a feature value vector corresponding to the state of the target region to be examined at step S130, calculating an anomaly score using a pretrained auto-encoder by receiving the feature value vector as input at step S140, and determining whether the target device to be monitored is anomalous using the anomaly score at step S150.

Here, the feature value vector may be calculated based on a pattern dictionary that is predefined so as to correspond to each of patterns in the target region to be examined.

Here, the pattern dictionary may correspond to a predefined vector corresponding to a numeric value or an image in the target region to be examined.

Here, the auto-encoder may be pretrained by using the output screen of the target device to be monitored in a normal state as training data.

Here, whether the target device to be monitored is anomalous may comprise determining that the target device to be monitored is in an anomaly state when the anomaly score is greater than a threshold.

Here, whether the target device to be monitored is anomalous may comprise determining that the target device to be monitored is in an anomaly state when the integral value of the anomaly score in a preset section, which is calculated using the distribution of the anomaly score changing over time, is greater than a threshold.

Here, although not illustrated in FIG. 1, the method may further include providing an anomaly state alarm when it is determined that the target device to be monitored is in an anomaly state, and the anomaly state alarm may include a screen in which an anomaly part is displayed to be distinguished from other parts in the target regions to be examined in the output screen of the target device to be monitored.

Here, the anomaly state alarm may include information acquired by visualizing time-series data of the anomaly score.

Hereinafter, the present disclosure will be described in detail with reference to FIGS. 2 to 14.

Figure 2:
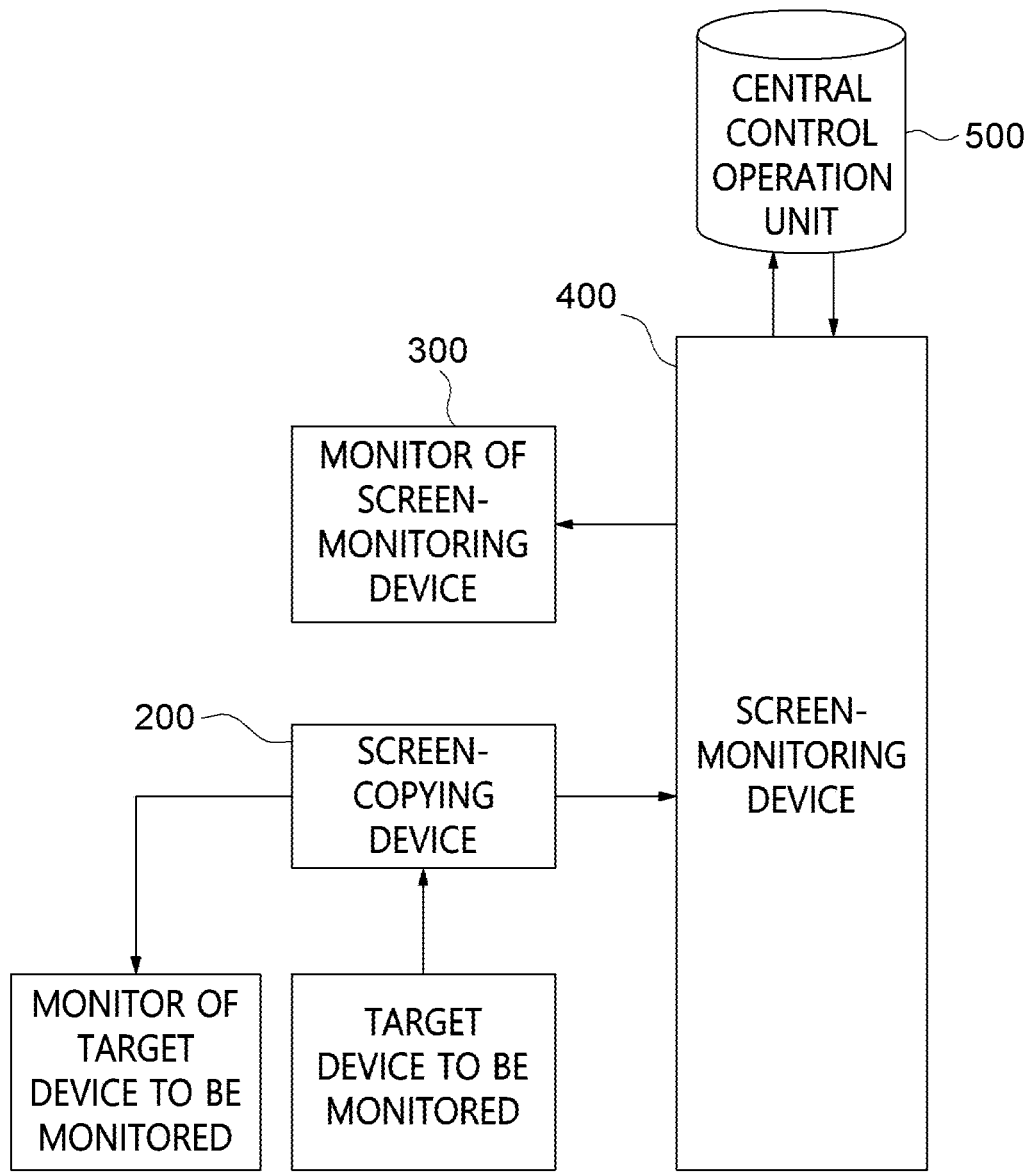
FIG. 2 illustrates the configuration of a screen-monitoring system according to an embodiment of the present disclosure.

FIG. 2 illustrates the configuration of a screen-monitoring system according to an embodiment of the present disclosure.

Referring to FIG. 2, the screen-monitoring system according to an embodiment of the present disclosure may include a target device to be monitored, the monitor of the target device to be monitored, a screen-copying device 200, the monitor of a screen-monitoring device 300, the screen-monitoring device 400, and a central control operation unit 500.

Figure 3:
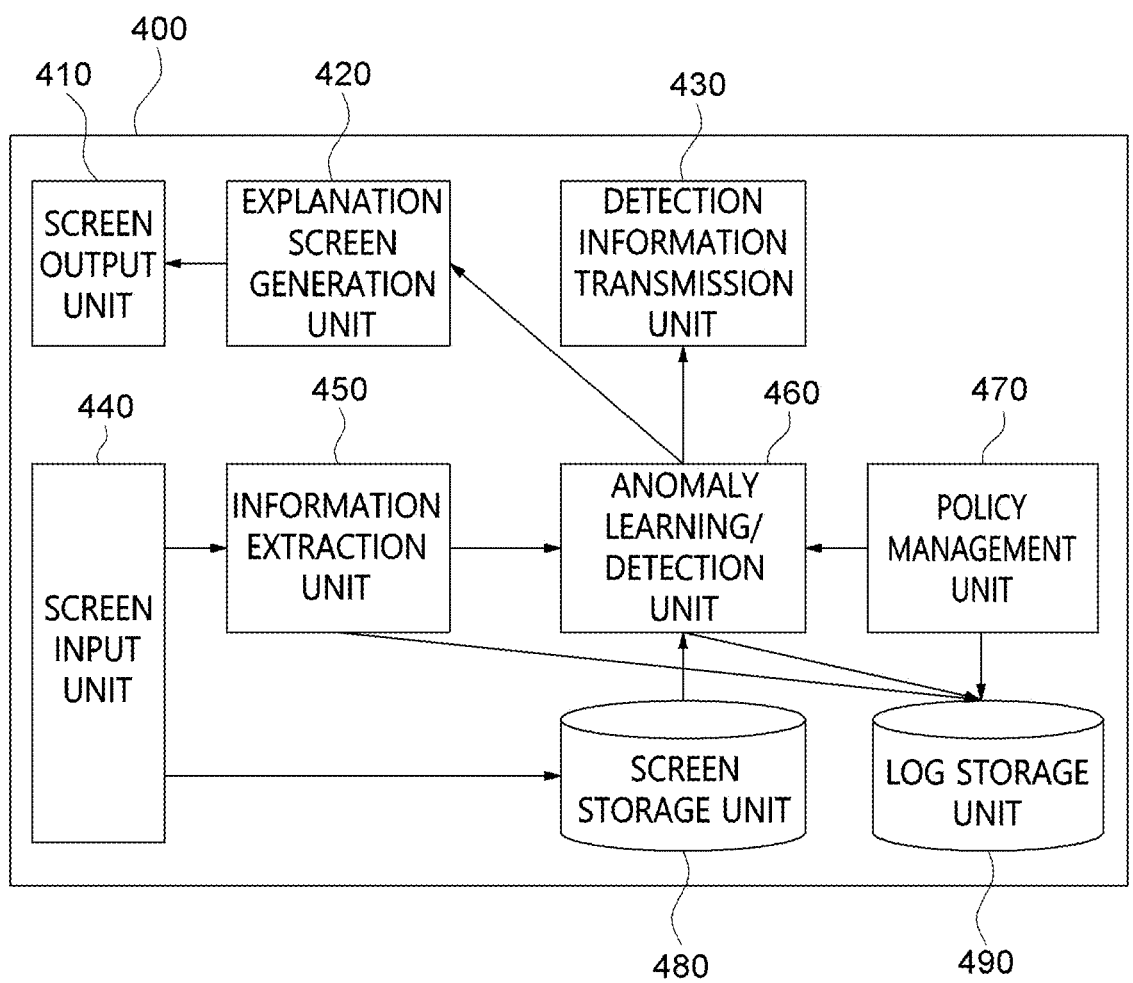
FIG. 3 illustrates the configuration of a screen-monitoring apparatus in detail.

FIG. 3 illustrates the configuration of a screen-monitoring device in detail.

Referring to FIG. 3, the screen-monitoring device 400 includes a screen output unit 410, an explanation screen generation unit 420, a detection information transmission unit 430, a screen input unit 440, an information extraction unit 450, an anomaly learning/detection unit 460, a policy management unit 470, a screen storage unit 480, and a log storage unit 490.

The screen-monitoring device detects anomaly status by monitoring the screen output of the target device to be monitored and performs a function of storing relevant information or transmitting the same to the outside.

The screen-copying device receives the screen signal of the target device to be monitored and copies the same. In order to support continuous screen output to the monitor of the existing target device to be monitored, a capture device in the form of a distributor is used.

The screen input unit 440 receives the screens to be monitored and deduplicates the same. Here, Structural Similarity (SSIM) may be used in order to determine whether a screen is repeated. SSIM is a method of calculating the similarity between images in consideration of brightness, contrast, and structures. In order to respond to a situation in which the similarity of the same screens is lowered due to physical noise in screen output signals, the screen input unit 440 sets a certain threshold, regards a screen as a new screen only when the similarity is lower than the threshold, and transfers the same to the information extraction unit. The corresponding screen information is transferred to the information extraction unit and is then stored in the screen storage unit 480.

The screen storage unit 480 stores the screen input thereto. Here, only the newest screens are stored according to a set rule (e.g., the capacity or the period), and the previous screens may be deleted, because a problem of storage capacity may be caused.

When the anomaly learning/detection unit 460 detects an anomaly, the screen storage unit 480 may provide a screen to the anomaly learning/detection unit 460 in order to generate an explanation screen.

The information extraction unit 450 extracts only pieces of information that are used for anomaly detection from a screen.

The information extraction unit 450 automatically locates regions in which information is updated in the screen. To this end, when the target device to be monitored is first accessed, a difference in a pixel between an image frame and an image frame subsequent thereto is calculated and accumulated, clustering is performed, and the target regions to be examined are numbered.

For the automatically extracted target regions to be examined, a region that is regarded as noise because the difference therein is equal to or less than a threshold is automatically excluded from candidates for the target regions. Also, correction may be performed by excluding a region determined by a user to be unnecessary or by reducing the region.

Figure 4:
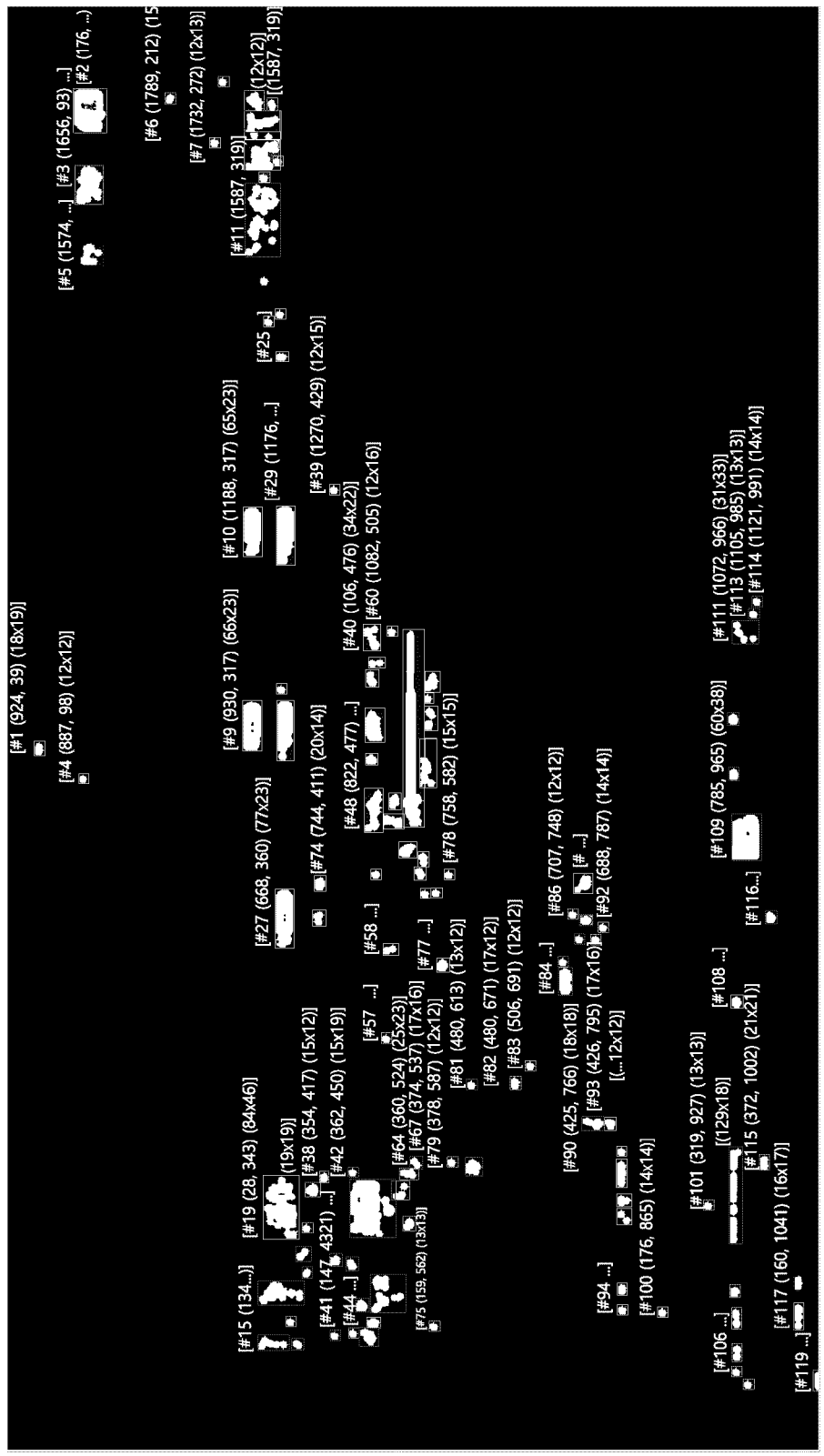
FIG. 4 is an example of an automatically extracted target region to be examined.

FIG. 4 is an example of automatically extracted target regions to be examined.

Referring to FIG. 4, it can be seen that parts in which a change in a numeric value, an image, or the like is detected in the screen to be monitored are extracted first as the target regions to be examined.

Figure 5:
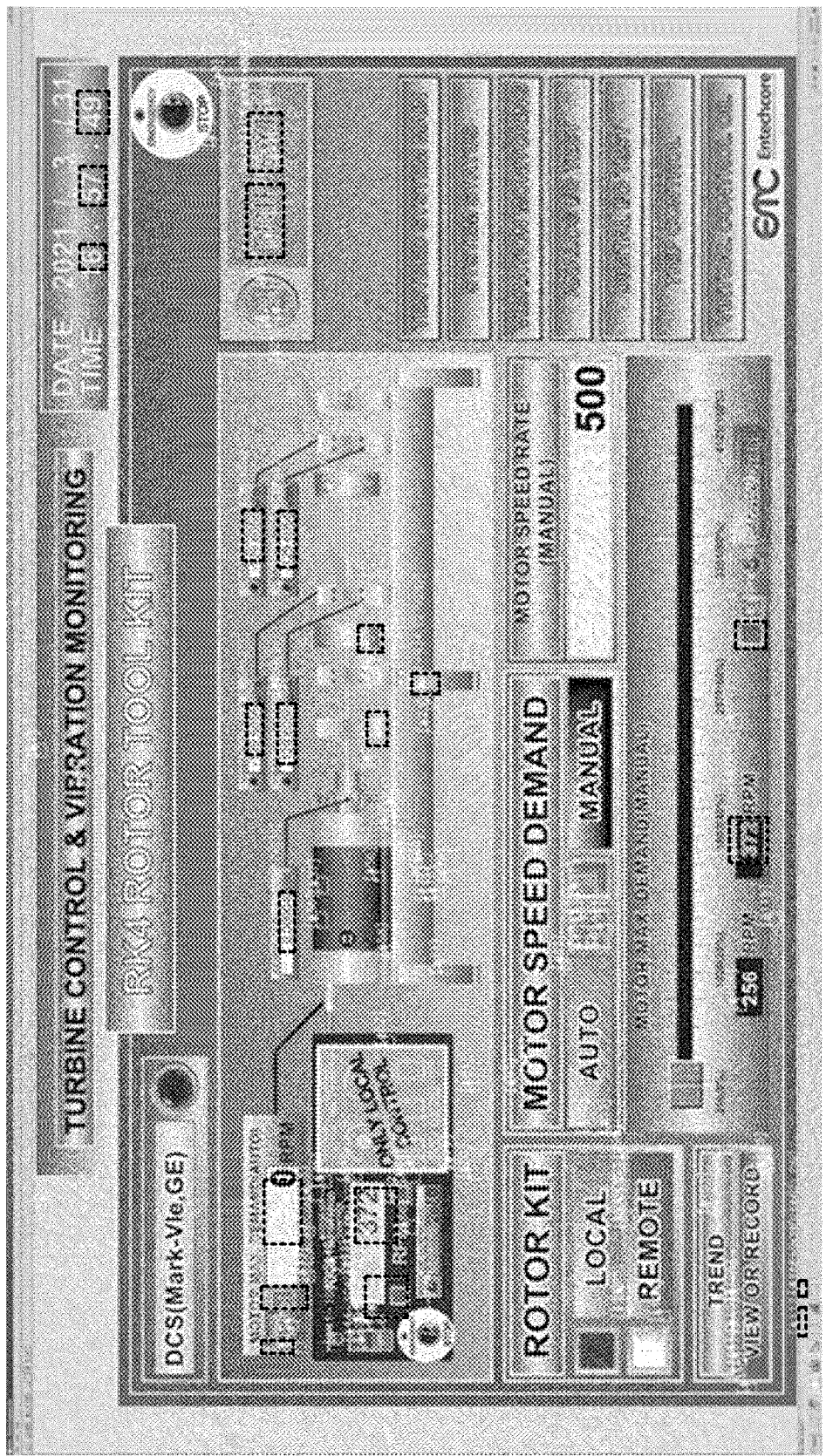
FIG. 5 is an example of a finally selected target region to be examined.

FIG. 5 is an example of finally selected target regions to be examined.

Referring to FIG. 5, it can be seen that an erroneously extracted region and a region that is not the target to be examined are excluded from the extracted regions illustrated in FIG. 4. That is, it can be seen that only the target regions to be examined, which are marked with the dark dotted line, remain.

Figure 6:
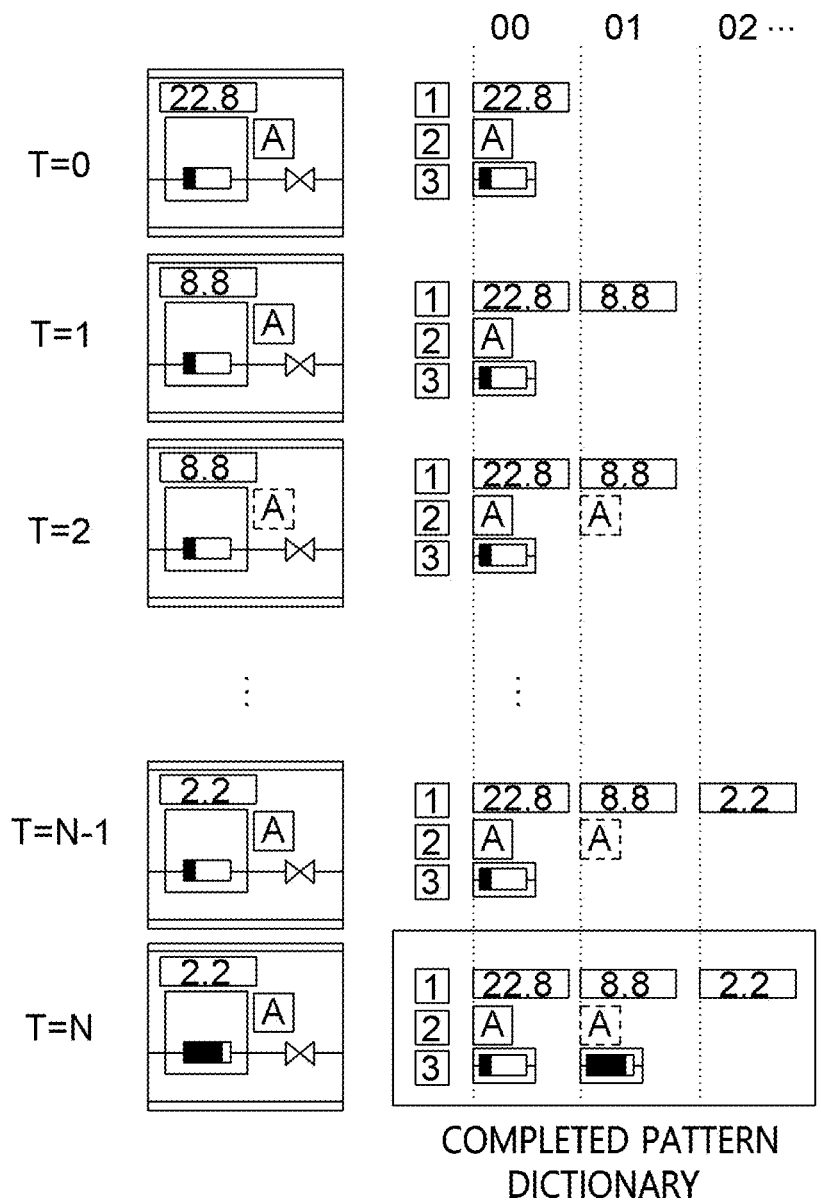
FIG. 6 conceptually illustrates a process of generating a pattern dictionary.

The information extraction unit 450 generates a pattern dictionary such as that illustrated in FIG. 6 for patterns appearing in each of the target regions to be examined.

FIG. 6 conceptually illustrates a process of generating a pattern dictionary.

Referring to FIG. 6, it can be seen that a feature vector value corresponding to each state is defined depending on a change in a numeric value, color, and an image in the target region of interest.

Subsequently, the information extraction unit 450 extracts a feature value vector through a comparison with the generated pattern dictionary for each of the target regions to be examined.

Figure 7:
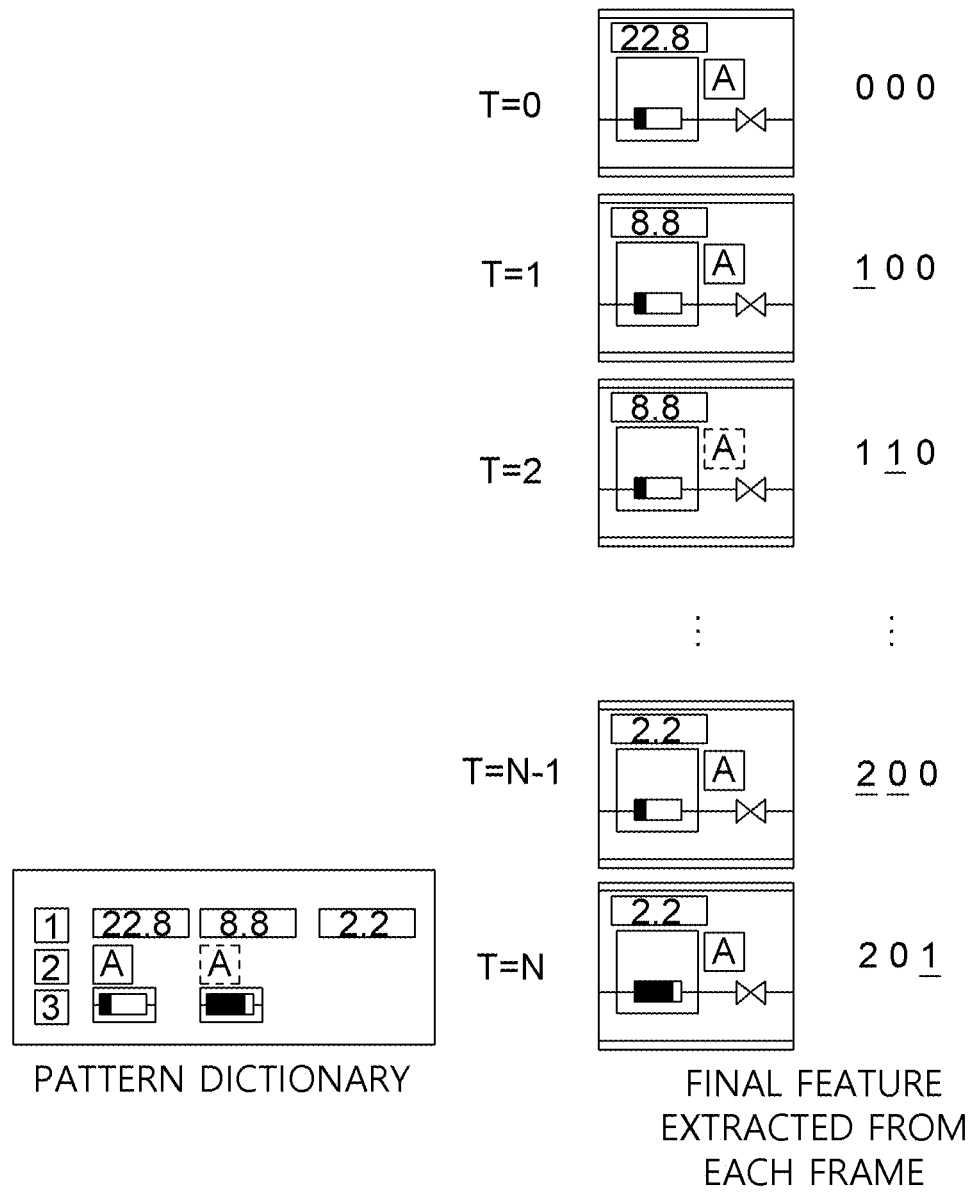
FIG. 7 conceptually illustrates calculation of a feature value vector of a target region to be examined.

FIG. 7 conceptually illustrates calculation of a feature value vector of the target region to be examined.

When text data is automatically inferred because it is included in the target region to be examined or when the target region to be examined is set by a user, the information extraction unit 450 performs character-reading in the target region to be examined, thereby outputting an actual numerical value of a state value as the feature value of the frame. Here, the decimal precision of the numerical value may be limited by the user. In the case of a state value, all appearing state values are recorded and automatically categorized, whereby a feature value in the form of an integer value is extracted.

The information extraction unit completes a final feature value vector of the frame by concatenating all of the feature value vectors extracted for each target region to be examined and transfers the same to the anomaly learning/detection unit.

An example of the final feature value vector for each image frame, which is extracted by the information extraction unit 450, is as shown in FIG. 8.

FIG. 8 is an example of concatenation of feature value vectors extracted from a target region to be examined.

Figure 9:
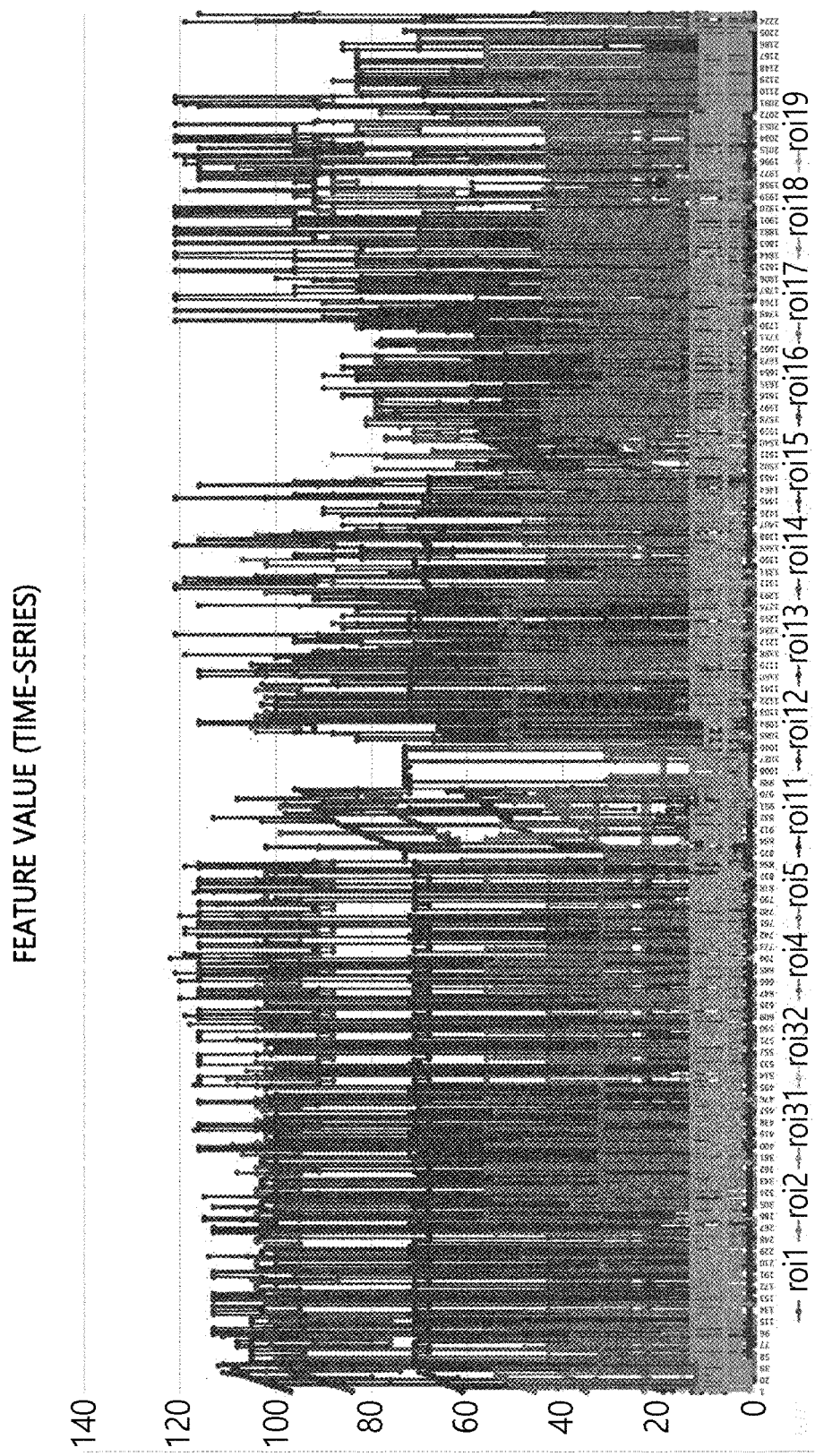
FIG. 9 is a graph illustrating that a feature value vector extracted from a target region to be examined changes over time.

FIG. 9 is a graph illustrating that the feature value vector extracted from the target region to be examined changes over time.

The anomaly learning/detection unit 460 implements an auto-encoder by learning normal status data extracted by the information extraction unit 450 and performs anomaly detection based on a reconstruction error.

The auto-encoder of the anomaly learning/detection unit 460 learns the screen of the device during the normal operation for a long time, thereby being trained to receive a normal state and reconstruct the normal state.

The anomaly learning/detection unit 460 determines normality/abnormality by counting the failure of reconstruction based on the output of the auto-encoder and calculating an anomaly score by totaling the same.

Figure 10:
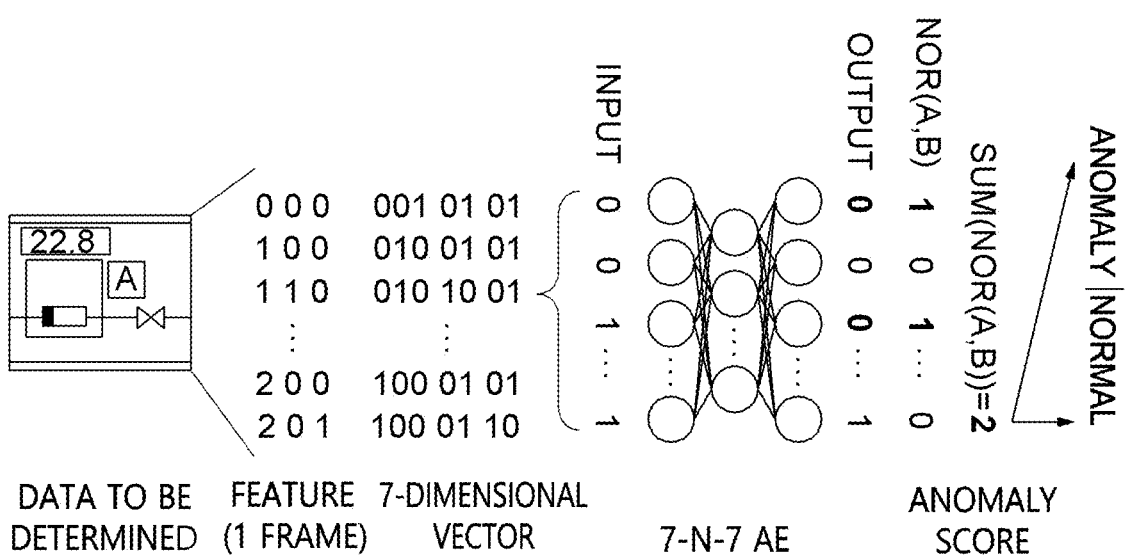
FIG. 10 conceptually illustrates a method of calculating an anomaly score.

FIG. 10 conceptually illustrates a method of calculating an anomaly score.

For example, when three kinds of target regions to be examined (a valve value, a closed state, and an operation mode) are included as shown in FIG. 10 and when three, two and two types of patterns are present in respective pattern dictionaries, a seven-dimensional feature value vector is acquired. In the illustrated example, the anomaly score becomes 2 because the auto-encoder fails in reconstruction of two feature values, among seven feature values.

Figure 11:
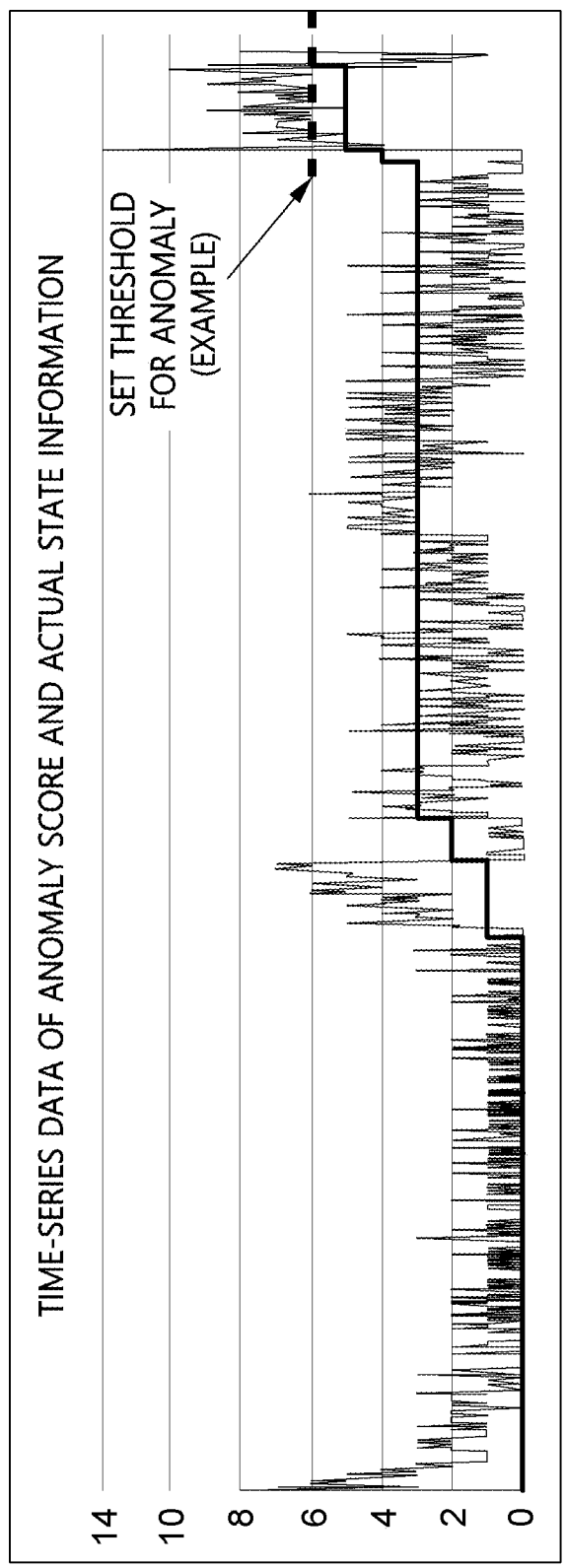
FIG. 11 is an example of the distribution of an anomaly score and a method of setting a threshold.

FIG. 11 is an example of the distribution of an anomaly score and a method of setting a threshold.

In the case of an anomaly score, the distribution of the value thereof extracted from normal state data is different from the distribution of the value thereof extracted from abnormal data. The dark solid line in FIG. 11 denotes actual state information and the light solid line denotes a change in the anomaly score for each frame, and it can be seen that the distribution of the anomaly score varies depending on a normal/abnormal state (the normal state is 0, 1, 2, 3, and 4, and the abnormal state is 5 and 6).

Here, in order to minimize erroneous detection, implementation may be made to ring an alarm only when it is determined based on the integral value of the anomaly score that the anomaly score consistently falls within an abnormal range.

The auto-encoder of the anomaly learning/detection unit 460 may be configured as a single model using a feature value vector extracted from the entire screen, or auto-encoders are implemented for respective subsystems of the target system to be monitored, after which the anomaly scores of the respective auto-encoders may be added. Further, different weights are assigned to the subsystems of the system depending on the importance or criticality thereof, and the anomaly scores are extracted in the form of a linear combination, whereby a monitoring system may be tuned to the field in which the system is used.

The explanation screen generation unit 420 notifies a user of the determination result and the anomaly score based on the analysis result of the anomaly learning/detection unit 460 and highlights the region estimated to cause the abnormal situation on the screen.

The explanation screen generation unit 420 visualizes the time-series data value of the anomaly score and shows the same to an operator, whereby the operator may easily recognize whether the current anomaly score is relatively higher or lower than the previous value.

The explanation screen generation unit 420 specifies a region for which reconstruction by the auto-encoder is failed and generates an explanation screen in the form of a visual alarm for the problematic region such that the controller can recognize the corresponding target region to be examined and immediately judge the situation.

Figure 12:
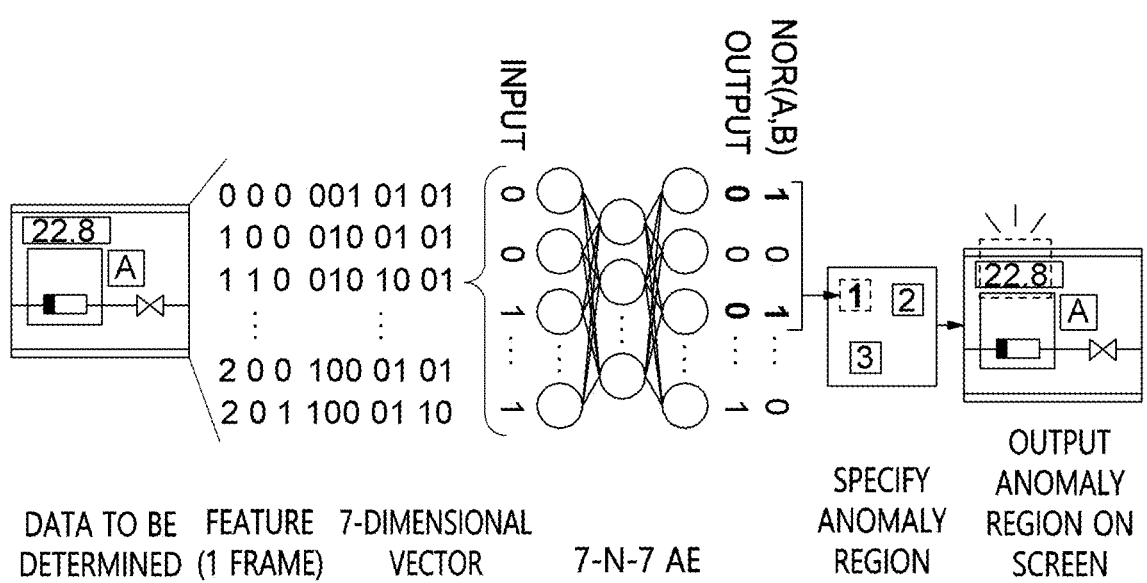
FIG. 12 is an example of generation of an explanation screen.

FIG. 12 is an example of generation of an explanation screen.

The screen output unit 410 serves to output the generated explanation screen to the monitor of the screen-monitoring device.

The policy management unit 470 may temporarily erase an alarm generated due to a system limitation or change in a specific target region to be examined. Also, it combines logs on anomalies occurring in respective target regions to be examined, thereby setting an upper-level alarm and a report policy.

The detection information transmission unit 430 serves to transmit an upper-level alarm caused by the anomaly detection log and policy to the central control unit.

Figure 13:
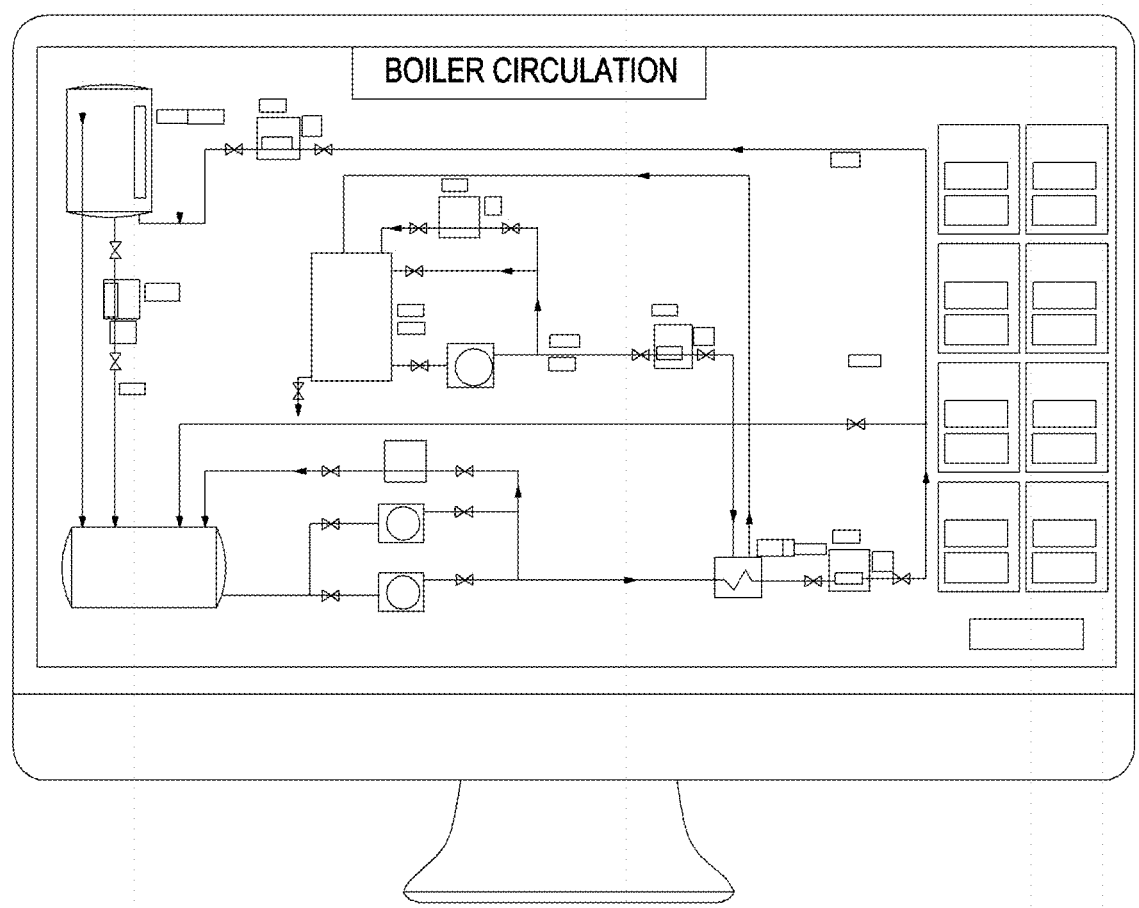
FIG. 13 is an example of a monitoring screen in a normal state.

FIG. 13 is an example of the monitoring screen in a normal state.

Figure 14:
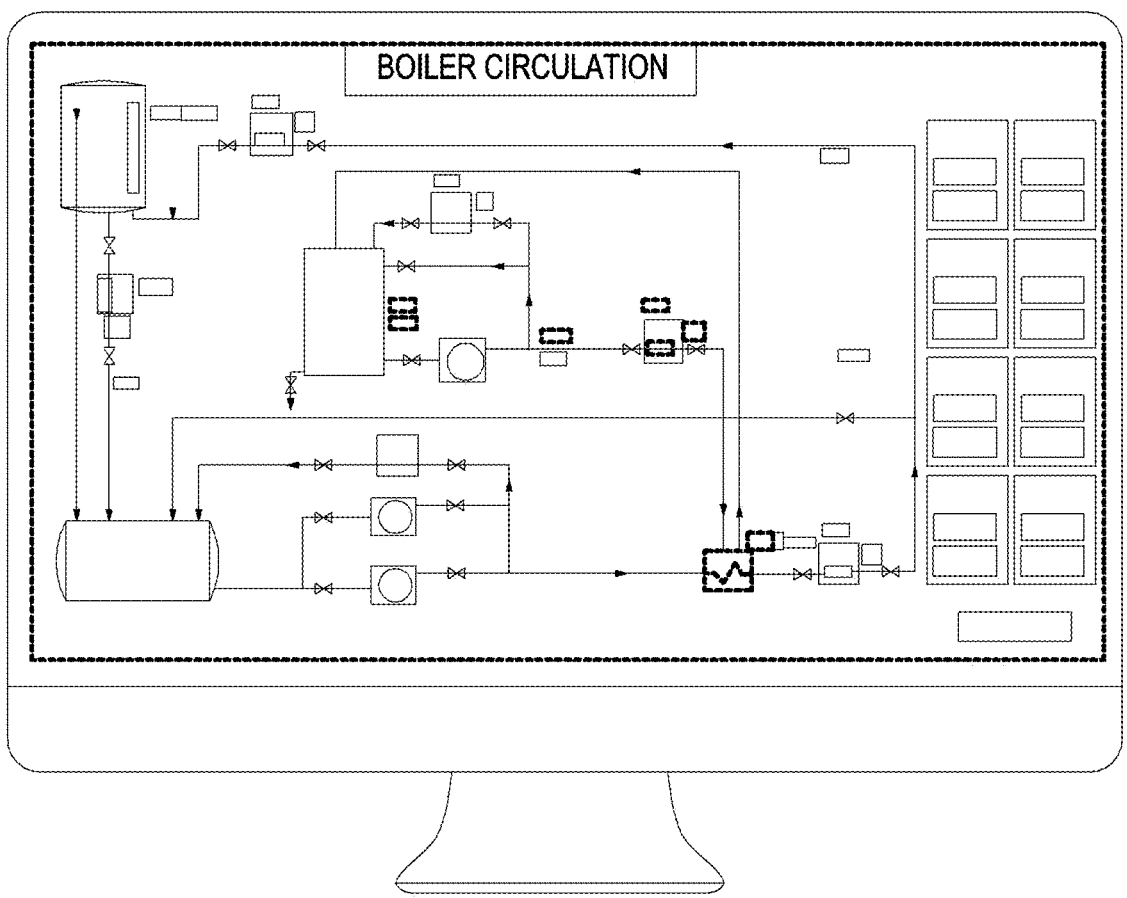
FIG. 14 is an example of a monitoring screen in an anomaly state.

FIG. 14 is an example of the monitoring screen in an anomaly state.

Figure 15:
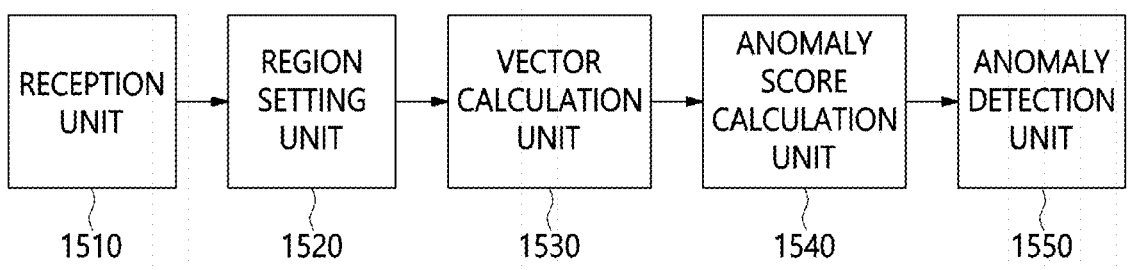
FIG. 15 is a block diagram illustrating an apparatus for detecting an anomaly state based on screen output according to an embodiment of the present disclosure.

FIG. 15 is a block diagram illustrating an apparatus for detecting an anomaly state based on screen output according to an embodiment of the present disclosure.

The apparatus for detecting an anomaly state based on screen output according to an embodiment of the present disclosure includes a reception unit 1510 for receiving the output screen of the target device to be monitored, a region setting unit 1520 for setting a target region to be examined in the output screen of the target device to be monitored, a vector calculation unit 1530 for calculating a feature value vector corresponding to the state of the target region to be examined, an anomaly score calculation unit 1540 for calculating an anomaly score using a pretrained auto-encoder by receiving the feature value vector as input, and an anomaly detection unit 1550 for determining whether the target device to be monitored is anomalous using the anomaly score.

Here, the feature value vector may be calculated based on a pattern dictionary that is predefined to correspond to each of patterns in the target region to be examined.

Here, the pattern dictionary may correspond to a predefined vector corresponding to a numeric value or an image in the target region to be examined.

Here, the auto-encoder may be pretrained by using a screen output in the normal state of the target device as training data.

Here, determining whether the target device to be monitored is anomalous may comprise determining that the target device to be monitored is in an anomaly state when the anomaly score is greater than a threshold.

Here, determining whether the target device to be monitored is anomalous may comprise determining that the target device to be monitored is in an anomaly state when the integral value of the anomaly score in a preset section, which is calculated using the distribution of the anomaly score changing over time, is greater than a threshold.

Here, although not illustrated in FIG. 15, the apparatus may further include an alarm provision unit for providing an anomaly state alarm when it is determined that the target device to be monitored is in an anomaly state, and the anomaly state alarm may include a screen in which the anomaly part is displayed to be distinguished from other parts in the target regions to be examined in the output screen of the target device to be monitored.

Here, the anomaly state alarm may include information acquired by visualizing time-series data of the anomaly score.

Figure 16:
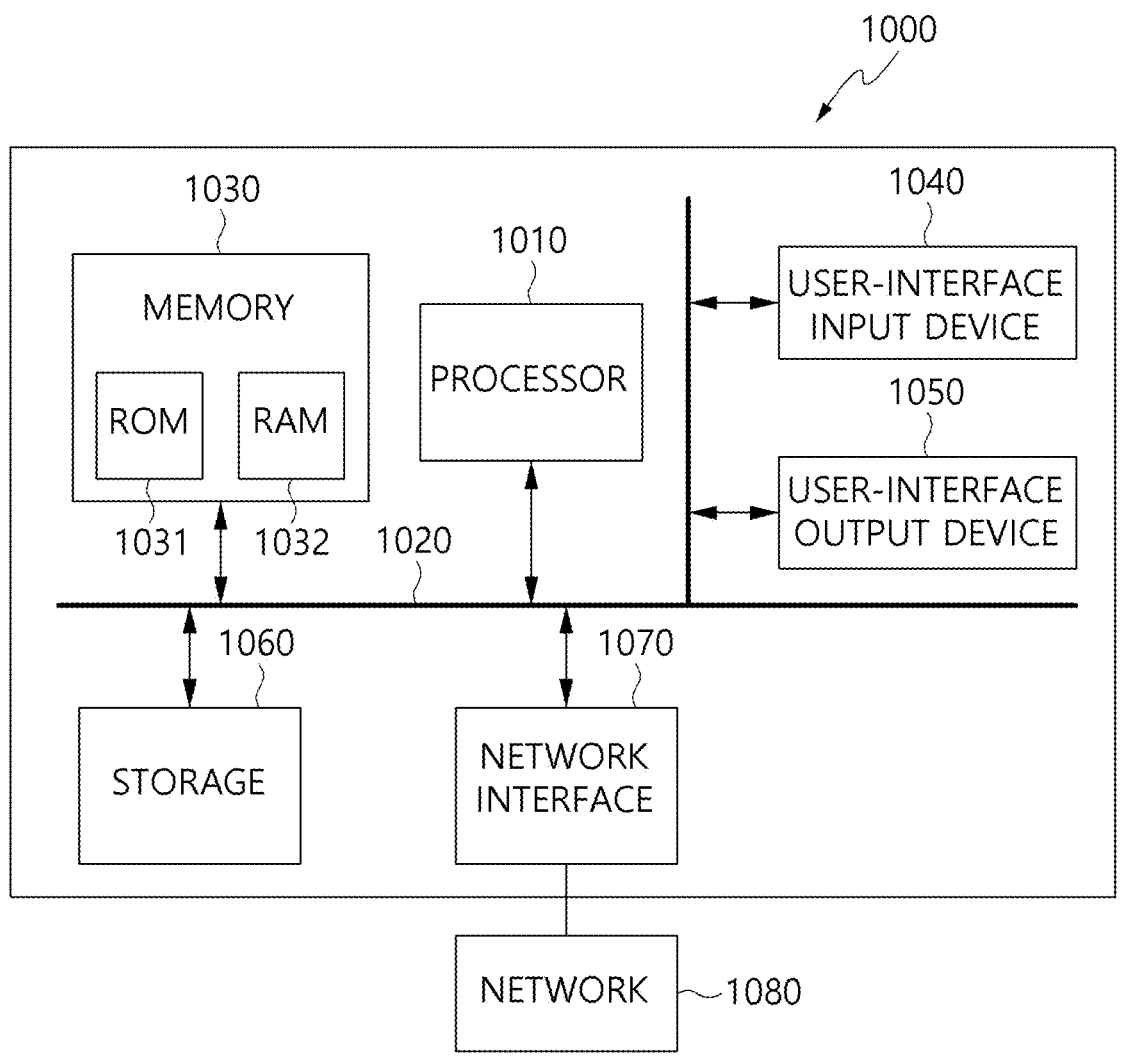
FIG. 16 is a view illustrating the configuration of a computer system according to an embodiment.

FIG. 16 is a view illustrating the configuration of a computer system according to an embodiment.

The apparatus for detecting an anomaly state based on screen output according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a nonvolatile medium, a detachable medium, a non-detachable medium, a communication medium, or an information delivery medium, or a combination thereof. For example, the memory 1030 may include ROM 1031 or RAM 1032.

According to the present disclosure, the operating status of the target device to be monitored is monitored through the screen output signal thereof without installing an agent (software) therein, and abnormal states, such as a failure in a control system, a security threat, an anomalous operation caused by a mistake of an operator, and the like, may be detected.

According to the present disclosure, the availability of a control system may be ensured because the configuration thereof is not changed, and AI-based anomaly detection technology may be applied to the existing system while security is ensured, because a new system or software is not accessed over a network.

According to the present disclosure, an anomaly may be detected by extracting not only text displayed in a monitored screen of a control system but also various kinds of images representing the control state of the sub-devices of the control system, warnings, and the behavior of an operator manipulating buttons and changing a state.

According to the present disclosure, a normal or abnormal value is quantitively evaluated and provided to an operator, and when an abnormality is detected, an anomalous part in the screen that is predicted to directly cause the anomaly is provided. whereby the operator may quickly find the cause and take initial action when an anomaly occurs.

According to the present disclosure, when a user is using the target device to be monitored, if the use does not fit into a normal pattern, an alarm may be actuated or relevant information may be provided. Also, the rule corresponding to the behavior of the user (inputting a number, clicking an operation button, and the like) may be recorded as a log and used for task analysis, accident investigation, inspection, or the like.

In the present disclosure, the monitored information in the screen output of the target device to be monitored is analyzed and compared with the state information and monitored information of another device connected therewith, and may be used for monitoring whether the integrity of the entire system is maintained. For example, when information indicating that a number '10' is transmitted to a counterpart system is checked through the UI of the target device to be monitored, whether 10 is transmitted thereto is checked, or when the state information of the target device monitored by a monitoring device is displayed as 100 on the screen of the monitoring device, whether the state of the target device is 100 is checked.

According to the present disclosure, the behavior of a user on the target device to be monitored, such as manipulation of a button, modification of a state, or the like, may be recorded along with additional information input by the user. For example, the start/finish of a specific task, such as a system maintenance task, a user test, system initialization, the shift of administrators, or the like, is announced, whereby a record on the device, the user task, and the like may be easily stored as a digital log. The stored information may be used for anomaly detection, accident investigation, post investigation, inspection, and the like.

The present disclosure has an effect of continuously checking the screen state that needs to be monitored, such as a subway service information board, a subway arrival board, a large display screen, a bus service board, a billboard, or the like, as if it were directly checked by humans.

According to the present disclosure, there may be provided a method for detecting anomaly status by monitoring screen information output through the target device to be monitored when it is difficult to install agent software in the target device to be monitored.

Also, the present disclosure may detect anomaly status based on numeric values, image information, and the like on a dashboard that shows the state of the target device to be monitored.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for detecting an anomaly state based on screen output, comprising:
   receiving an output screen of a target device to be monitored;
   setting a target region to be examined in the output screen of the target device to be monitored;
   calculating a feature value vector corresponding to a state of the target region to be examined;
   calculating an anomaly score using a pretrained auto-encoder by receiving the feature value vector as input; and
   determining whether the target device to be monitored is anomalous using the anomaly score.

2. The method of claim 1, wherein the feature value vector is calculated based on a pattern dictionary predefined to correspond to each of patterns in the target region to be examined.

3. The method of claim 2, wherein the pattern dictionary is a predefined vector corresponding to a numeric value or an image in the target region to be examined.

4. The method of claim 2, wherein the auto-encoder is pretrained by using a screen output in a normal state of the target device as training data.

5. The method of claim 4, wherein determining whether the target device to be monitored is anomalous comprises determining that the target device to be monitored is in an anomaly state when the anomaly score is greater than a threshold.

6. The method of claim 4, wherein determining whether the target device to be monitored is anomalous comprises determining that the target device to be monitored is in an anomaly state when an integral value of the anomaly score in a preset section, which is calculated using a distribution of the anomaly score changing over time, is greater than a threshold.

7. The method of claim 1, further comprising:
   providing an anomaly state alarm when it is determined that the target device to be monitored is in an anomaly state,
   wherein the anomaly state alarm includes a screen in which an anomaly part is displayed to be distinguished from other parts in the target region to be examined in the output screen of the target device to be monitored.

8. The method of claim 7, wherein the anomaly state alarm includes information acquired by visualizing time-series data of the anomaly score.

9. An apparatus for detecting an anomaly state based on screen output, comprising:
   a processor; and a memory storing instructions which, when executed by the processor, cause the processor to:
   receive an output screen of a target device to be monitored;
   set a target region to be examined in the output screen of the target device to be monitored;
   calculate a feature value vector corresponding to a state of the target region to be examined;
   calculate an anomaly score using a pretrained auto-encoder by receiving the feature value vector as input; and
   determine whether the target device to be monitored is anomalous using the anomaly score.

10. The apparatus of claim 9, wherein the feature value vector is calculated based on a pattern dictionary predefined to correspond to each of patterns in the target region to be examined.

11. The apparatus of claim 10, wherein the pattern dictionary is a predefined vector corresponding to a numeric value or an image in the target region to be examined.

12. The apparatus of claim 10, wherein the auto-encoder is pretrained by using a screen output in a normal state of the target device as training data.

13. The apparatus of claim 12, wherein when determining whether the target device to be monitored is anomalous, the instructions, when executed by the processor, further cause the processor to determine that the target device to be monitored is in an anomaly state when the anomaly score is greater than a threshold.

14. The apparatus of claim 12, wherein when determining whether the target device to be monitored is anomalous, the instructions, when executed by the processor, further cause the processor to determine that the target device to be monitored is in an anomaly state when an integral value of the anomaly score in a preset section, which is calculated using a distribution of the anomaly score changing over time, is greater than a threshold.

15. The apparatus of claim 9,
wherein the instructions, when executed by the processor, further cause the processor to provide an anomaly state alarm when it is determined that the target device to be monitored is in an anomaly state,
wherein the anomaly state alarm includes a screen in which an anomaly part is displayed to be distinguished from other parts in the target region to be examined in the output screen of the target device to be monitored.

16. The apparatus of claim 15, wherein the anomaly state alarm includes information acquired by visualizing time-series data of the anomaly score.

\* \* \* \* \*